March 7, 1939. H. C. CARTER 2,149,934
AIR FLOW CONTROL FOR UNDERFEED STOKERS
Filed Feb. 4, 1935 3 Sheets-Sheet 1
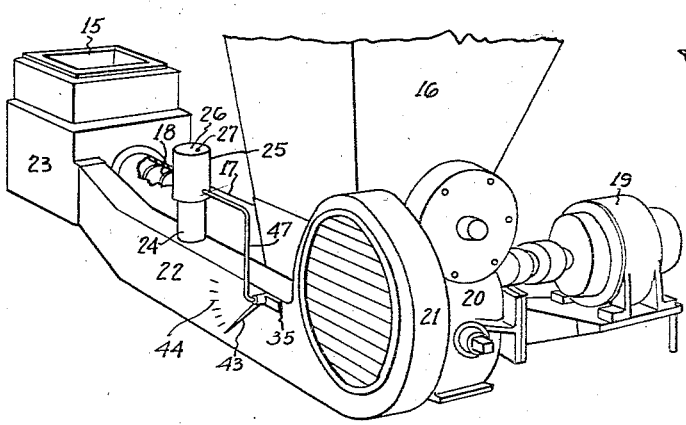
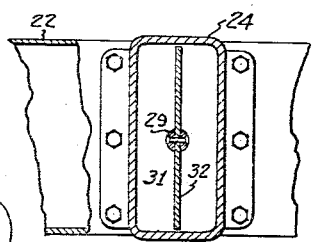
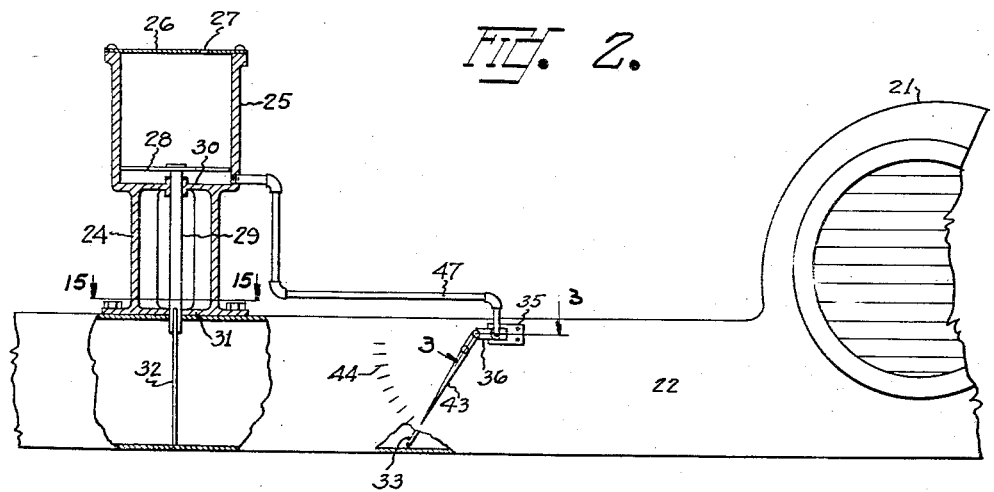
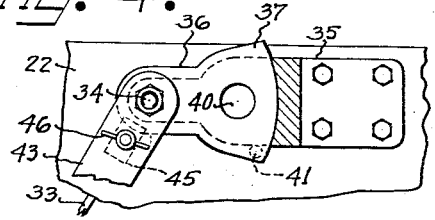
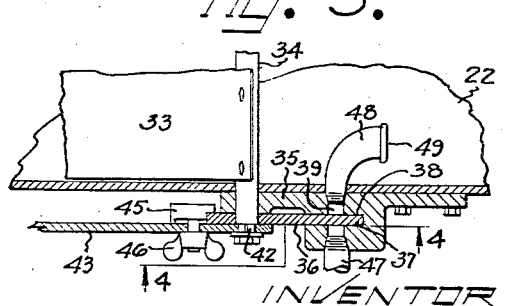
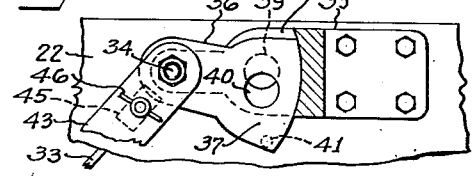
INVENTOR
H. C. CARTER
ATTORNEY March 7, 1939.  H. C. CARTER  2,149,934
AIR FLOW CONTROL FOR UNDERFEED STOKERS
Filed Feb. 4, 1935  3 Sheets-Sheet 2
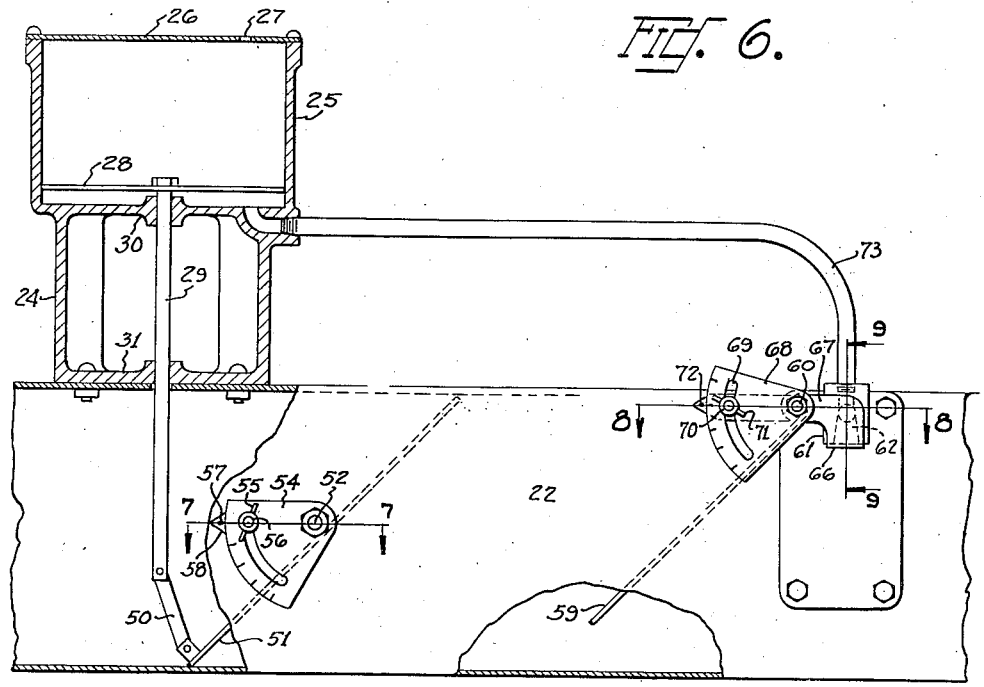
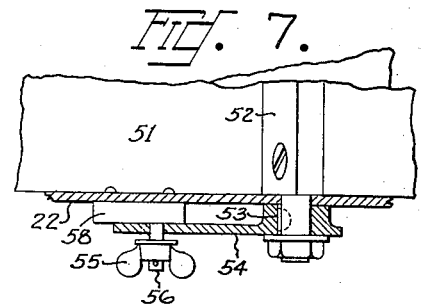
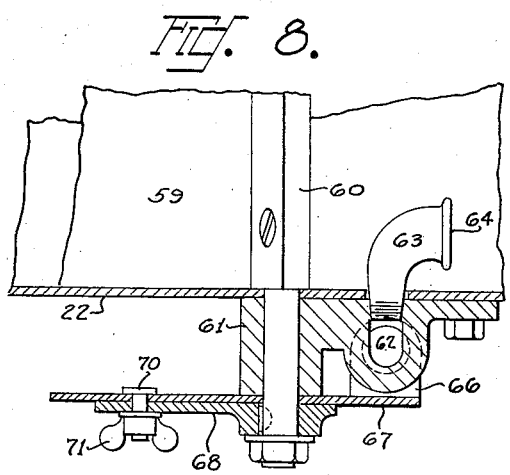
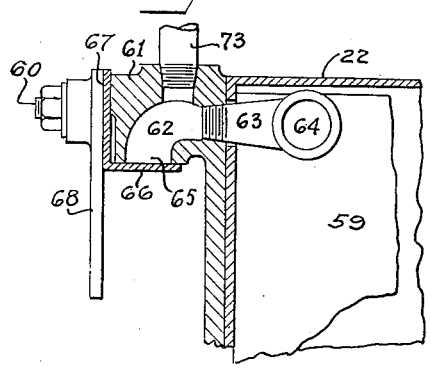
INVENTOR
H. C. CARTER
BY
ATTORNEY March 7, 1939.   H. C. CARTER   2,149,934
AIR FLOW CONTROL FOR UNDERFEED STOKERS
Filed Feb. 4, 1935   3 Sheets-Sheet 3
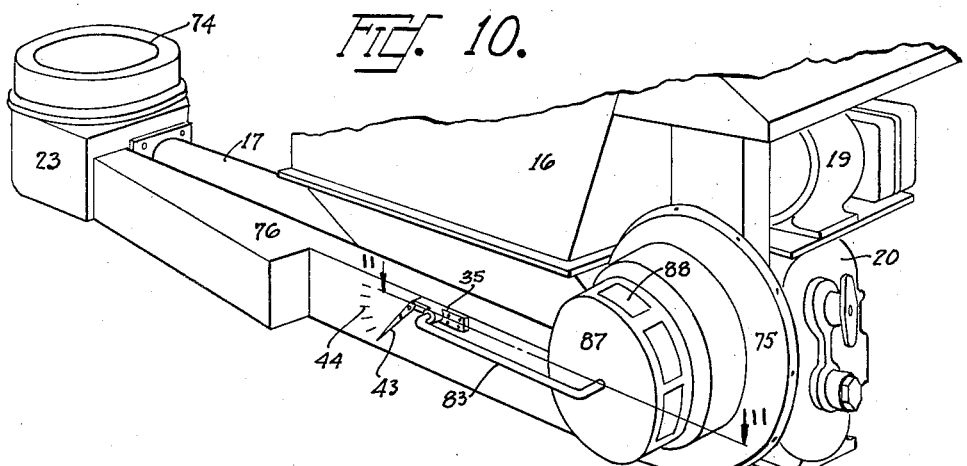
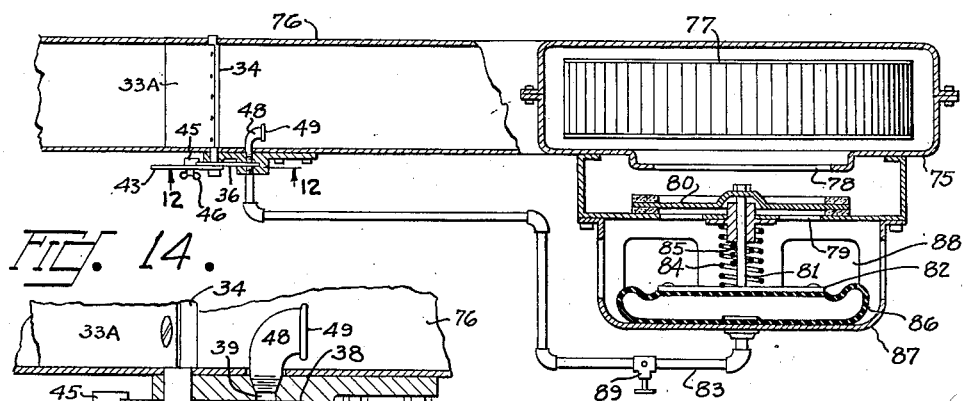
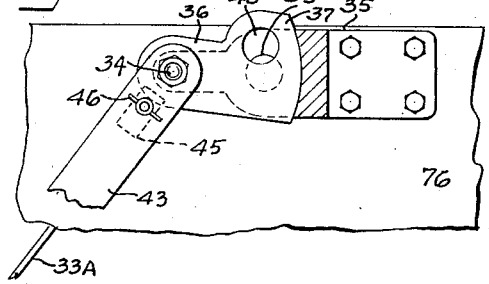
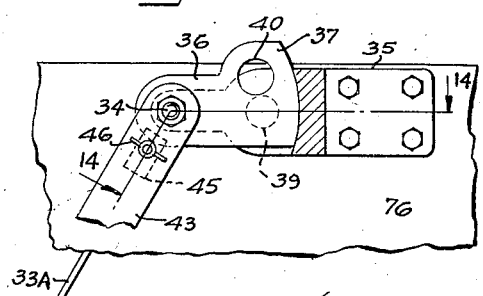
INVENTOR
H. C. CARTER
BY
ATTORNEY Patented Mar. 7, 1939

2,149,934

UNITED STATES PATENT OFFICE 2,149,934

AIR FLOW CONTROL FOR UNDERFEED STOKERS

Haskell C. Carter, Portland, Oreg., assignor to Iron Fireman Manufacturing Company, Portland, Oreg.

Application February 4, 1935, Serial No. 4,945

23 Claims. (Cl. 110—69)

This invention relates generally to underfeed stokers, and particularly to an air flow control therefor.

The main object of this invention is the provision of an air control which will insure a uniform or constant volume of air flowing through the air duct during the entire time fuel is being fed by the stoker.

The second object is to construct an air control for coal stokers which will be operated by static and velocity pressures, in other words, by total pressure.

The third object is to provide a simple, inexpensive and highly efficient form of control which will automatically correlate the air and fuel feeds regardless of variations in the resistance offered by the fuel bed itself.

I accomplish these and other objects in the manner set forth in the following specification as illustrated in the accompanying drawings, in which:

Fig. 1 is a perspective of a stoker equipped with my device.

Fig. 2 is a fragmentary side elevation with the actuating cylinder broken away in vertical section.

Fig. 3 is a section taken along the line 3—3 in Fig. 2.

Fig. 4 is a section taken along the line 4—4 in Fig. 3 showing the position of the valve when the fan is not being operated.

Fig. 5 is a view similar to Fig. 4 showing a position of the valve when the fan is being operated.

Fig. 6 is a fragmentary view of a modified form of the device showing the actuating cylinder and portion of the air duct in vertical section and showing the parts set for automatic operation.

Fig. 7 is a section taken along the line 7—7 in Fig. 6.

Fig. 8 is a section taken along the line 8—8 in Fig. 6.

Fig. 9 is a section taken along the line 9—9 in Fig. 6.

Fig. 10 is a perspective view of a modified form of the device in which the control is applied to the air inlet of the stoker fan.

Fig. 11 is a broken horizontal section taken along the line 11—11 in Fig. 10.

Fig. 12 is a section taken along the line 12—12 in Fig. 11, showing the valve in its position with the fan stopped.

Fig. 13 is a view similar to Fig. 12 showing the valve in a position with the fan operating.

Fig. 14 is a section taken along the line 14—14 in Fig. 12.

Fig. 15 is a section taken along the line 15—15 in Fig. 2.

Similar numbers of reference refer to similar parts throughout the several views.

Referring in detail to the drawings, in the form of the device shown in Figs. 1 to 5 inclusive, there is shown a retort 15 to which fuel is supplied from a hopper 16 through a fuel tube 17 by means of a worm 18, which is driven by a motor 19 through a transmission 20. A fan (not shown) is disposed within the fan casing 21, which is connected by the air duct 22 to the plenum chamber 23 around the retort 15. It will be understood that the transmission 20 is preferably of the variable speed type.

Referring particularly to my invention, it will be seen that there is mounted on the duct 22 a standard 24, which supports an upright cylinder 25, whose head 26 is provided with a vent 27. Within the cylinder 25 is a disk 28 which serves as a loose piston, same being mounted on the piston rod 29 which is slidable within the piston head 30 and in the base 31 of the standard 24. Attached to the lower end of the piston rod 29 is a main control damper 32 which completely closes the duct 22 when the piston 28 is in its lowermost position or opens it in proportion to the amount the piston 28 is raised.

Mounted in the air duct 22 between the fan casing 21 and the main control damper 32 is a pilot vane 33, which is secured to the rockable shaft 34 which journals in the sides of the air duct 22. The shaft 34 projects through a valve body 35 and also through a perforated plate 36, whose perforated portion 37 occupies a slot 38 in the valve body 35. A hole 39 passes through the valve body 35 and can register with the opening 40 in the plate portion 37. It is desirable to provide a stop 41 on the plate portion 37 to limit the opening movement of the valve to a full open position when the fan is stopped.

On the square end 42 of the shaft 34 is mounted an indicator arm or pointer 43 and the duct 22 is provided with a series of marks 44 by means of which the pointer 43 can indicate the position of the pilot vane 33. In order that the position of the plate 36 may be adjusted with relation to the indicator arm 43 and the pilot vane 33, there is provided a clamp 45, which is held by means of a wing nut 46. The pin 41 makes it very convenient to adjust the relationship of the plate 36 which is loose on the round shaft 34 and the indicator arm 43 which is on a square portion of the same shaft because when the plate is pushed upwardly around its pivot the holes 39 and 40 are brought into registry altho these cannot be seen from the outside. The damper 33 is raised the desired amount by lifting the pointed end of member 43 until the setting is such as to obtain the desired fixed volume of air. The graduations 44 make it convenient to position the damper correctly and with the plate held so that the pin 41 is in contact, the thumb nut 46 is tightened which has the effect of rigidly fastening together the plate 36 and the pointer or indicator arm 43 so that these two thereafter move as a unit. The hole 39 in the valve body 35 is connected by means of a pipe 47 to the lower end of the cylinder 25. Communicating with the inner end of the hole 39 is a street L 48, whose open end 49 faces the fan.

The operation of this form of the device is as follows:

With the parts in the position shown in Fig. 2, that is with the fan not operating, the main control damper 32 is in its lowermost position in which it serves as a banking damper preventing air from reaching the fuel bed as a result of the natural draft. Now assuming that the fan is operated, it is evident that at first there will be no flow of air past the main control damper 32 and therefore the pilot vane 33 will not be moved, and pressure will be built up in the air duct 22 between the damper 32 and the fan, and since the hole 39 registers with the opening 40, as shown in Fig. 4, air will pass through the pipe 47 into the cylinder 25 on the underside of the piston 28 causing it to rise and to carry with it the main control damper 32.

Obviously, the air within the cylinder 25 above the piston 28 must be displaced, and it escapes through the vent 27 giving a cushioning action to the upward movement of the piston 28. As the damper 32 opens, air flows past the pilot vane 33, causing it to rise and to move the plate 36 to a position similar to the one shown in Fig. 5, that is moving the hole 39 and the opening 40 out of register and restricting the flow of air to the cylinder 25. Owing to the fact that there is an appreciable clearance around the piston 28, air can pass around same and escape through the vent 27 to the atmosphere, thus permitting the piston 28 to descend making it possible to secure a state of balance between the parts.

In other words, for a given setting between the pilot vane 33 and the plate 36, a relatively fixed volume of air will be delivered by the fan to the combustion chamber regardless of the resistance offered by the fuel bed.

In the form of the device shown in Figs. 6 to 9 inclusive, the piston rod 29 is joined by a link 50 to a butterfly main control damper 51, which is pivotally mounted on the shaft 52, which journals in the sides of the air duct 22 and has secured on its outer end by means of a key 53 a slotted arm 54, which is capable of being clamped in a desired position by means of the wing nut 55 on the stud bolt 56. The arm 54 is graduated to facilitate the desired non-automatic setting of the balanced damper 51, an index 57 being provided on the block 58. The wing nut 55 is normally loosened in the automatic operation of the control so that the movement of the balanced damper 51 and the arm 54 which moves with it shall be under control of the piston 28.

In this form of the device, the pilot vane 59 is hingedly mounted on the shaft 60, which journals in the sides of the air duct 22 and in the valve body 61. In the valve body 61 is formed an L-shaped passageway 62, whose inner end is connected to a street L 63, which is within the duct 22, whose open end 64 faces the fan. The outlet 65 of the passageway 62 is normally closed by the valve 66 which consists of the inturned end of the valve arm 67, which is rotatable on the shaft 60.

Keyed on the shaft 60 is an indicator arm 68, which is provided with an arcuate slot 69 within which is disposed the bolt 70, which is held by the valve 67. The bolt 70 is provided with a wing nut 71. The indicator arm 68 is graduated and the valve arm 67 is provided with an index mark 72 to facilitate the setting of the arm 68 to a desired relationship with the valve arm 67. The passageway 62 communicates by means of a pipe 73 with the lower end of the cylinder 25.

The operation of this form of the device is quite similar to that shown in Figs. 1 to 5, except that in this form of the device the main control damper 51 is balanced, thereby facilitating the operation thereof and also that when a static head is built up within the duct 22 between the main control damper 51 and the fan itself, air enters the street L 63 and passes through the open pipe 73 to the cylinder 25, thereby causing the main control damper 51 to open and permitting air to flow past the pilot vane 59 and utilizing its velocity to raise same, causing the valve 66 to open and air to waste to the atmosphere as this valve turns about its pivot which is the shaft 60, again permitting the establishment of a balance between the volumes of air and fuel delivered as determined by the static head within the duct 22 and also on the velocity of the air passing through the duct 22.

In the form of the device shown in Figs. 10 to 14 inclusive, the retort 74 is connected to the fan casing 75 by means of an air duct 76. In this form of the device, the fan 77 is provided with two inlet openings 78 and 79, which are in series and spaced from each other. Between the openings 78 and 79 is disposed a fan damper 80, which may close either of these two openings. While it normally closes the opening 79, as illustrated, when the fan is not operating; upon the building up of excessive pressure in the flexible bag 86, it is forced to a position to close the opposite opening 78 so as to shut off the supply of air to the fan or blower 77. The damper 80 is mounted on the slidable rod 81, which is actuated by the diaphragm 82, which is connected by means of the valve control pipe 83 with the valve body 35, the parts of which are identical with those described in Figs. 3 to 5 inclusive. The diaphragm 82 is urged toward a collapsed position by means of the spring 84 and is provided with a shorter spring 85 to enable the fan damper 80 to open against the vacuum produced by the fan 77. Thus it will be seen that the diaphragm 82 will rise relatively quickly, when the fan 77 is started but will move very much slower when the shorter spring 85 is engaged as at such time the upward movement of the diaphragm 82 is resisted by both of the springs.

It will be noted that the flexible bag 86, of which the diaphragm 82 forms a part, is supported by the cage 87, through whose side openings 88 air can pass through the openings 79 and 78 into the fan 77. It is desirable to provide a valve 89. It will be noted that in this form of the device, the control of the air flow is made at the fan inlet, while in the previously described forms, it is made in the air duct itself.

In this form of the device, when the fan 77 is not operated, the spring 84 will move the damper 80 to close the opening 79, causing same to serve as a banking damper. If, however, the stoker motor is operated in response to any of its controls, the fan 77 is operated and the partial vacuum produced in the casing 75 unseats the fan damper 80 permitting air to be drawn into the casing 75 and discharged into the duct 76. The air from the fan 77 enters the street L 48, as shown in Fig. 11, and as the air from the fan 77 flows past the pilot vane 33–A, causing same to rise, the hole 39 and opening 40 are brought into register, as shown in Fig. 13, permitting air to flow through the pipe 83 ino the bag 86 and overcoming the spring 84 and gradually increasing the restriction to the flow of air through the opening 78. Obviously, the speed of this operation can be controlled by the setting of the valve 89.

While in this form of the device, the arrangement of the parts is somewhat different than those in the two forms previously described, the principal difference is in the location of the control point, namely at the fan inlet opening. It will be noted that in all of the forms of this device, herein illustrated and described, total pressure is utilized to maintain the correct air flow, and at the same time the velocity of the air is utilized in different degrees and at different times in conjunction with the static pressure for the purposes above enumerated.

Attention is drawn to co-pending applications, Serial Nos. 558,726 and 564,014, describing air control devices for stokers over which the device described herein is an improvement and deals particularly with the automatic control of the air flow.

I claim:

1. In an underfeed stoker a combination of an air supply duct having means for supplying air thereto, a main control damper disposed within said duct and movable to increase or decrease the resistance of flow of air through the duct, a pneumatic actuator for said main control damper, a pilot vane responsive to velocity of flow of air and located within said duct between said air supplying means and the main control damper, an air pipe extending from said pneumatic actuator to the interior of said air duct and having an intake opening facing in the direction of said air supplying means and a valve actuated by said pilot vane for controlling the flow of air through said air pipe to said pneumatic actuator, whereby an increase of velocity of air past the pilot vane will cause the valve to lessen the flow of air through the air pipe so the actuator will move the main damper to restrict the flow of air to the stoker, thus maintaining a uniform volume of air flow to the stoker.

2. In an underfeed stoker the combination of a retort, an air duct for supplying air to said retort, a main control damper disposed within said duct, a pneumatic actuator connected to move said control damper to open position in response to air pressure in the duct, a pilot vane disposed within said duct, a valve connected to be actuated toward closed position by said pilot vane as the vane moves in response to air velocity, and an air pipe communicating by way of said valve between said pneumatic actuator and the interior of said duct whereby as the velocity of the air increases the opening of the valve decreases thereby allowing the main control damper to restrict the air flow.

3. In an underfeed stoker the combination of an air duct having a fan for supplying air thereto, a main control damper disposed within said duct having a pneumatic actuator therefor, means for passing a supply of air from said duct to said pneumatic actuator to control the same, a pilot vane within said duct, a valve for said pneumatic actuator operable by said pilot vane to close said damper in proportion to the velocity of air in the duct and an adjustable indicator for varying the relationship between said pilot vane and valve setting.

4. In an underfeed stoker the combination of an air duct, a main control damper disposed within said duct, a pneumatic actuator for said damper, a pipe for supplying air from said duct to said actuator, means for retarding the operation of said actuator, means for varying the flow of air from said duct to said actuator, said last mentioned means consisting of a pilot vane actuating valve whereby an increase in the flow of air past said pilot vane will increase the restriction to the flow of air to said pneumatic actuator.

5. A device of the class described characterized by having a pilot vane responsive to the velocity of air flowing through an air duct, a main control damper responsive to the flow and static head of the air passing through said duct, means actuated by the pilot vane for rendering the control damper less responsive to air flow and means for varying the relationship of said damper and vane and for indicating the relative positions of said damper and vane.

6. In a device for regulating the flow of air to the retort of an underfeed stoker so as to insure the delivery of a constant volume of air per unit of time for combustion; an air supply duct, a device governing the flow of air through said duct, pressure actuated means responsive to pressure in said air duct for operating said device to alter the resistance offered to the flow of air through said duct, and means including a vane within the duct for regulating the pressure transmitted to said pressure actuated means in inverse ratio to the velocity of air flow through the duct.

7. The device of claim 6 in which the vane is pivoted within the duct so as to be moved in accordance with the velocity of the air flowing and said last named means including a bleeder valve movable with the vane to control the pressure transmitted to the pressure actuated means.

8. In a device for regulating the flow of air from the fan to the retort of an underfeed stoker so as to insure the supply of a constant volume of combustion air per unit of time; an air supply duct leading from the fan to the retort, a main control device movable to restrict the flow through said duct, pneumatic means for moving said device, a passageway connecting the pneumatic means with the interior of the air duct, a valve for controlling the flow of air through said passageway and means movable in response to changes in velocity of air within the duct for controlling the position of said valve, said means being responsive to a lessening of velocity of air in the duct from normal flow to move the valve to position to cause the main control device to open further and which means in response to an increase in velocity from normal flow will cause a movement of the device toward a closing position.

9. In an air supply means for feeding combustion air under pressure to the retort of an underfeed stoker; an air duct, a main control damper constantly urged to banking position, a pneumatically operated member for moving the damper in opposition to said urge, a passageway leading from the air duct to said member to move the member so as to open the damper, a valve for modifying flow through said passageway, a pilot vane pivoted in said duct so as to be moved in accordance with the velocity of air flowing, and means adjustably connecting the vane and the valve so that the damper and the vane assume relative positions when air is flowing and an increase in velocity of the air causing a relative closing of the main control damper.

10. In combination, an air duct, a device for restricting or closing the duct, pneumatic means responsive to pressure within the duct for moving the device toward open position, and valved means governed by the velocity of flow for modifying the pressure transmitted to the pneumatic means in inverse proportion to the velocity of flow.

11. In a device for regulating the flow of air from the fan to the retort of an underfeed stoker so as to insure the supply of a constant volume of combustion air per unit of time: an air supply duct leading from the fan to the retort, a banking damper constantly urged to a position to close said duct, pneumatic means for moving said damper toward opening position, a passageway connecting said pneumatic means with the in- ling volumetrically the admission of air to the flow of air through said passageway and means movable in response to changes in velocity of air within the duct for controlling the position of said valve whereby when air is flowing in normal operation a lessening of velocity of air in the duct will move the valve to position to cause the damper to open further and an increase in velocity will cause a movement of the damper toward closing position.

12. The device of claim 11 in which the velocity responsive means includes a vane in said duct.

13. The device of claim 11 in which the velocity responsive means includes a vane in said duct and the valve is adjustably secured to move with the vane and bleeds the passageway to the atmosphere as the vane moves toward closed position.

14. In fuel burning apparatus having a fuel support and an air chamber for supplying air thereto, the combination of a blower operable to feed air into said chamber, a damper for controlling volumetrically the admission of air from the blower to the chamber, said damper tending normally to assume a closed position to shut off the supply of air from the blower to the chamber, a movable regulating device disposed outside the air chamber and operatively connected with the damper, and means for rendering air pressure from said chamber effective on said movable regulating device to move said damper to open positions.

15. In fuel burning apparatus having a fuel support and an air chamber for supplying air thereto, the combination of a blower operable to feed air into said chamber, a damper for controlling volumetrically the admission of air to the blower, said damper tending normally to assume a closed position, a movable regulating device disposed outside the air chamber and operatively connected with the damper, and means for rendering air pressure from said chamber effective on said movable regulating device to move said damper from said closed position upon an increase in pressure in said air chamber and to move the damper to restrict the flow of air to the blower when the pressure exceeds a chosen amount.

16. The device of claim 15 in which the damper moves between two spaced inlet openings in series.

17. The device of claim 15 in which the damper is spring pressed to close an outer inlet opening but may move against said spring to close an inner inlet opening in series with the outer inlet opening, and there is a second spring not engaging the damper when closing the outer inlet opening but which resists movement of the damper when approaching the inner inlet opening.

18. In fuel burning apparatus having a fuel support and means for feeding fuel thereto, the combination of a blower, a conduit for conducting air from the blower to the fuel support, a damper for controlling admission of air to the blower, said damper tending to assume a closed position when the blower is not operating, and regulating means operable by air pressure in the conduit to move the damper from said closed position upon an increase in pressure in the conduit and to move the damper to shut off air to the blower upon further increase of pressure to an excessive amount.

19. The device of claim 18 in which the regulating means includes a vane responsive to the velocity of air flow.

20. The device of claim 18 in which the regulating means includes a pneumatic device, an air passageway connecting the pneumatic device with the conduit, and a valve in said air passageway.

21. In an intermittently operated underfeed stoker, an air duct, means for creating a flow of air through said duct, a damper movable to modify the flow of air through the duct, a pilot member within the duct and movable in accordance with the velocity of the air moving in said duct, and means cooperating with said pilot member to affect the position of the damper, whereby when the flow creating means is first caused to operate it builds up a pressure in the duct, moving the damper to a position to increase the flow of air through the duct in proportion to the degree of pressure within the duct, and when in normal operation the position of the damper is controlled by the pressure within the duct as modified by the velocity of flow of air in the duct.

22. The device of claim 21 in which the damper moves to closed position to act as a banking damper when the flow ceases.

23. The device of claim 21 in which the damper moves between two inlet openings, closing one of said openings when the flow ceases so as to act as a banking damper, and covering the other of said openings whenever the pressure in the duct exceeds a chosen amount.

HASKELL C. CARTER.